United States Patent
Hoyweghen et al.

(10) Patent No.: US 7,294,675 B2
(45) Date of Patent: Nov. 13, 2007

(54) SOFT THERMOPLASTIC VULCANIZATE COMPOSITIONS

(75) Inventors: Danny Van Hoyweghen, Heverlee (BE); Tonson Abraham, Strongsville, OH (US); Bahar Azimipour, Collegeville, PA (US)

(73) Assignee: Advanced Elastomer Systems, L.P., Akron, OH (US)

( * ) Notice: Subject to any disclaimer, the term of this patent is extended or adjusted under 35 U.S.C. 154(b) by 400 days.

(21) Appl. No.: 11/012,752

(22) Filed: Dec. 15, 2004

(65) Prior Publication Data

US 2005/0277738 A1 Dec. 15, 2005

Related U.S. Application Data

(60) Provisional application No. 60/578,623, filed on Jun. 9, 2004.

(51) Int. Cl.
*C08F 8/00* (2006.01)
*C08L 9/00* (2006.01)
*C08L 23/00* (2006.01)
*C08L 23/04* (2006.01)

(52) U.S. Cl. ............... 525/191; 525/232; 525/240

(58) Field of Classification Search ........... 525/191, 525/232, 240
See application file for complete search history.

(56) References Cited

U.S. PATENT DOCUMENTS

| 4,130,535 | A | 12/1978 | Coran et al. |
| 4,212,787 | A | 7/1980 | Matsuda et al. |
| 5,349,005 | A | 9/1994 | Tanaka |
| 6,245,856 | B1 | 6/2001 | Kaufman |
| 6,288,171 | B2 | 9/2001 | Finerman |
| 6,342,565 | B1 | 1/2002 | Cheng |
| 6,407,174 | B1 | 6/2002 | Ouhadi |
| 6,525,157 | B2 | 2/2003 | Cozewith |
| 6,642,316 | B1 | 11/2003 | Datta |
| 6,713,520 | B2 | 3/2004 | Sahnoune |
| 6,852,424 | B2 * | 2/2005 | Dharmarajan et al. ...... 428/516 |

FOREIGN PATENT DOCUMENTS

| EP | 0 892 831 | 1/1999 |
| EP | 0 969 043 | 1/2000 |
| EP | 0 992 538 | 4/2000 |
| WO | WO 97/39059 | 10/1997 |
| WO | WO 02/051634 A1 | 7/2002 |

OTHER PUBLICATIONS

Rubber Compounding: Chemistry and Applications, Chapter 5, entitled Thermoplastic Elastomers: Fundamentals and Applications, Abraham et al., Marcel Dekker, 2004, New York, pp. 197-201.

* cited by examiner

*Primary Examiner*—Nathan M. Nutter
(74) *Attorney, Agent, or Firm*—Shawn H. Foster; Kevin M. Faulkner

(57) ABSTRACT

Disclosed herein are low Shore A Hardness thermoplastic vulcanizate compositions having high Rebound values. In at least one exemplary embodiment, the compositions include a dispersed at least partially vulcanized rubber component; a thermoplastic component; and process oil; wherein the weight ratio of the thermoplastic component to the rubber component ranges from 80:20 to 15:85; and the thermoplastic component comprises more than 80 wt % of a polypropylene (preferably a random propylene copolymer) having a melting point less than about 105° C. The compositions can be used in molded products, consumer goods and the like.

33 Claims, No Drawings

SOFT THERMOPLASTIC VULCANIZATE COMPOSITIONS

This application claims the benefit of Provisional Application No. 60/578,623 filed Jun. 09, 2004.

BACKGROUND

1. Field of Invention

The invention described below generally relates to thermoplastic vulcanizate compositions (TPVs), preferably "soft" TPVs, i.e., those having low hardness levels.

2. Description of Related Art

Thermoplastic vulcanizate compositions (TPVs) typically include a rubber component, a thermoplastic component, additive oil and other ingredients such as curing additives and the like. Specific examples of TPVs are seen in U.S. Pat. No. 6,288,171. A variety of properties of TPVs are considered to be important, including but not limited to rebound, tensile strength and elongation, as well as varying degrees of softness or hardness. One of the many challenges in making TPVs is to obtain the right balance of properties.

Thermoplastic elastomer blends having a cured rubber content are well known in the art. See, e.g., ASTM D 1566-03. In U.S. Pat. No. 4,130,535, a cured (vulcanized) thermoplastic elastomer, also referred to as a thermoplastic vulcanizate or TPV, is made from a polyolefin resin and an olefin rubber. The at least partially cured state of the thermoplastic elastomer is obtainable by subjecting the blend of uncured rubber and thermoplastic resin to a curing process. This process can be static or dynamic and be done by the use of known curing agents, like peroxides or phenolic resins.

A dynamically vulcanized polyolefinic thermoplastic elastomer typically consists of 1-5 micron sized crosslinked rubber particles (typically the major phase) in a continuous semi-crystalline polyolefin matrix (typically the minor phase). TPV composition processability and physical properties (such as tensile strength) within the elastomer service temperature range are due at least in part to the continuous semi-crystalline polyolefin matrix. The matrix is the "hard" phase as opposed to the rubber "soft" phase (where the terms "hard" and "soft" are understood as being relative to one another). The hardness of the TPV composition depends on the relative amounts of soft and hard phases present. Reducing the "hard" semi-crystalline polyolefin phase would increase TPV softness at the expense of decreased product processability. A lower amount of the matrix, or, if the matrix is insufficient to provide a continuous phase, can result in TPV rubber particle agglomeration which would manifest itself as a "powdery" instead of a "continuous" thermoplastic on processing, for example, by melt extrusion of the product in compounding or finishing.

Physical properties also tend to be lowered when an insufficient matrix "glue" is present that holds the crosslinked rubber particles together. Thus, desirable soft TPV compositions are not necessarily readily produced. Moreover, increased TPV rubber content alone will not afford soft TPV compositions; added additive oil is necessary. But TPV compositions containing excess oil often tends to swell the rubber phase and therefore reduce plastic phase volume, which may result in the already mentioned disadvantages. Also, low molecular weight rubber and/or plastic molecules that are unattached to the TPV network can render the product "sticky" in the presence of oil. Unattached plastic molecules are those not incorporated into the polyolefin crystallites and unattached rubber molecules are those that are not bound to the crosslinked rubber network. Thus, it is often difficult to commercially produce viable TPV compositions with the desired levels of softness (low hardness).

Crosslinking of the rubber phase, e.g., during vulcanization, tends to increase TPV hardness, but TPV compositions containing a large amount of uncrosslinked rubber do not necessarily provide commercially viable soft products. The ethylene content in many commercially available EPDM rubber generally varies from about 50 weight % to about 70 weight %. The incorporation of uncrosslinkable EP rubber into a TPV composition or the addition of EPDM rubber to a preformed TPV composition will not necessarily yield a suitable soft product. The uncrosslinked rubber would be compatible with the crosslinked rubber phase, and will tend to be included into this phase, and thus the previously mentioned drawbacks of a high rubber content TPV composition will not be overcome. If an excessive amount of uncrosslinked rubber is present, or if all the rubber in the polyolefinic thermoplastic elastomer is uncrosslinked, then this "soft" product would suffer the processing and property disadvantages of a continuous rubber phase as opposed to those of the desirable continuous plastic phase for the thermoplastic elastomer product.

Certain thermoplastic elastomers targeted to have a Shore A Hardness of less than 35 are described in EP-B-0 892 831. That patent describes a blend of rubber and thermoplastic resin, the rubber being at least partially cured, comprising a) the thermoplastic resin, b) an uncured amorphous poly-α-olefin or an ethylene and $C_{3-20}$ α-olefin amorphous copolymer and c) an at least partially cured rubber, wherein the weight ratio of b) to a) plus b) is 15-75 wt. %, and where weight ratio of c) to a) plus b) plus c) is 25-75 wt. %. Additionally, "soft polyolefins" are addressed in the article "Versatile New Soft Polyolefin For Compounding With Other Soft Thermoplastics Resins or as a TPV Base Resin", L. Struzik, et al. (ANTEC 2003). This soft polyolefin is described as an in-situ polyolefin that has high rubber content prepared by selection of catalyst and process technology. The soft polyolefin is taught for use where elastomeric properties are sought by either blending with other polyolefins or by a process of dynamic vulcanization of the rubber content in the soft polyolefin. The examples illustrate compositions having Shore A hardness at or above about 60.

SUMMARY

The invention claimed herein relates to thermoplastic vulcanizate compositions (TPVs). At least one specific embodiment is directed to a thermoplastic vulcanizate composition that includes a dispersed, at least partially vulcanized, rubber component; a thermoplastic component; and additive oil; wherein the weight ratio of the thermoplastic component to the rubber component ranges from 80:20 to 15:85; and the thermoplastic component includes more than 80 wt % of a polypropylene having a melting point less than about 105° C., preferably a polypropylene that is crystallizable, more preferably a random propylene copolymer.

Another specific embodiment is directed a thermoplastic vulcanizate composition that includes a dispersed, at least partially vulcanized, rubber component; a thermoplastic component that includes polypropylene and a random propylene copolymer having a melting point ranging from 25° C. to 105° C.; and additive oil; wherein the composition is in a vulcanized state; the weight ratio of the thermoplastic component to the rubber component ranges from 80:20 to 15:85; the weight ratio of the random propylene copolymer to the polypropylene is greater than 100:100; and the Shore A Hardness of the composition is 40 or less.

Another specific embodiment is directed to a thermoplastic vulcanizate composition that includes: a dispersed at least partially vulcanized rubber component; a thermoplastic component that includes polypropylene and a random propylene copolymer having a melting point ranging from 25° C. to 105° C.; and additive oil; wherein: the weight ratio of the thermoplastic component to the rubber component ranges from 80:20 to 15:85; the weight ratio of the random propylene copolymer to the polypropylene is greater than 100:100; and the Rebound of the composition is greater than 55%.

DETAILED DESCRIPTION

Thermoplastic Vulcanizate Compositions. The term "thermoplastic vulcanizate composition" (also referred to as simply thermoplastic vulcanizate or TPV) is broadly defined as any material that includes (at least) a dispersed, at least partially vulcanized, rubber component; a thermoplastic component; and an additive oil. Preferably, other ingredients, e.g., other additives, are also included (discussed below).

Articles. The thermoplastic vulcanizate compositions described herein are useful for making a variety of articles such as tires, hoses, belts, gaskets, moldings and molded parts. They are particularly useful for making articles by extrusion, injection molding, blow molding, and compression molding techniques. They also are useful for modifying thermoplastic resins and in particular polyolefin resins. The compositions can be blended with thermoplastic resins using conventional mixing making a rubber modified thermoplastic resin. These compositions will be particularly useful in consumer goods where a "soft feel" is desirable, such as touch pads, handle inserts, overcasings (e.g., used for shaving razors) and the like. Specific embodiments that may be reflected in certain claims are directed to articles (such as those identified above) that include some or all of the TPV compositions disclosed herein.

Vulcanizates. The term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, that can be utilized in dynamic vulcanization.

Dynamic Vulcanization. The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin. Depending on the degree of cure, the rubber to thermoplastic resin ratio, compatibility of rubber and thermoplastic resin, the kneader type and the intensity of mixing (shear rate), other morphologies, such as co-continuous rubber phases in the plastic matrix, are possible.

Extractables. Subsequent to vulcanization (preferably dynamic vulcanization), e.g., crosslinking of the rubber phase of the thermoplastic vulcanizate, desirably less than 50 weight percent or less than 20 weight percent of the curable (crosslinkable) rubber is extractable from the specimen of the thermoplastic vulcanizate in boiling xylene or cyclohexane. As the term is used herein, a "partially vulcanized" rubber is one wherein more than 5 wt % of the crosslinkable rubber is extractable in boiling xylene or cyclohexane, e.g., more than 5 wt % and up to 20 wt %, or 30 wt %, or 50 wt %. A "fully vulcanized" (or fully cured or fully crosslinked) rubber in which a given percentage range of the crosslinkable rubber is extractable, e.g., 5 wt % or less, or 4 wt % or less, or 3 wt % or less, or 2 wt % or less, or 1 wt % or less. The percentage of extractable rubber can be determined by the technique set forth in U.S. Pat. No. 4,311,628, and the portions of that patent referring to that technique are hereby incorporated by reference.

Rubber Components. The term "rubber component" broadly means any material that is considered by persons skilled in the art to be a "rubber," preferably a crosslinkable rubber (e.g., prior to vulcanization) or crosslinked rubber (e.g., after vulcanization). In addition to natural rubber, specific rubber components include, without limitation, any olefin-containing rubber such as ethylene-propylene copolymers (EPM), including particularly saturated compounds that can be vulcanized using free radical generators such as organic peroxides, as noted in U.S. Pat. No. 5,177,147, which is incorporated by reference in pertinent part. Other rubber components are ethylene-propylene-diene (EPDM) rubber, or EPDM-type rubber. An EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. Those monoolefins desirably have the formula $CH_2=CH-R$ where R is H or an alkyl of 1-12 carbon atoms and are preferably ethylene and propylene. Desirably the repeat units from at least two monoolefins (and preferably from ethylene and propylene) are present in the polymer in weight ratios of 25:75 to 75:25 (ethylene:propylene) and constitute from about 90 to about 99.6 weight percent of the polymer. The polyunsaturated olefin can be a straight chained, branched, cyclic, bridged ring, bicyclic, fused ring bicyclic compound etc., and preferably is a nonconjugated diene. Desirably repeat units from the nonconjugated polyunsaturated olefin is from about 0.4 to about 10 weight percent of the rubber.

Another type of rubber component is butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. Desirably, from about 90 to about 99.5 weight percent of the butyl rubber are repeat units derived from the polymerization of isobutylene, and from about 0.5 to about 10 weight percent of the repeat units are front at least one polyunsaturated monomer having from 4 to 19 carbon atoms. Preferably the polyunsaturated monomer is isoprene or divinylbenzene. The polymer may be halogenated to further enhance reactivity in crosslinking. Preferably the halogen is present in amounts from about 0.1 to about 10 weight percent, more preferably about 0.5 to about 3.0 weight percent based upon the weight of the halogenated polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 weight percent isomonoolefin, more desirably from about 92 to about 98 weight percent, and from about 1 to about 12 weight percent p-alkylstyrene, more desirably from about 2 to about 8 weight percent based upon the weight of the copolymer before halogenation. Desirably the alkylstyrene is p-methylstyrene and the isomonoolefin is isobutylene. Desirably the percent bromine is from about 0.2 to about 8, more desirably from about 0.2 to about 3 weight percent based on the weight of the halogenated copolymer. The copolymer is a complementary amount, i.e., from about 92 to about 99.8, more desirably from about 97 to about 99.8 weight percent. These polymers are commercially available from Exxon Chemical Co.

Except as stated otherwise, the term "copolymer" means polymers derived from two or more monomers (including terpolymers, tetrapolymers, etc.), and the term "polymer" refers to carbon-containing compounds having repeat units from one or more different monomers.

EPDM, butyl and halobutyl rubbers are rubbers low in residual unsaturation and are preferred when the vulcanizate needs good thermal stability or oxidative stability. The rubbers low in residual unsaturation desirably have less than 10 weight percent repeat units having unsaturation. Desirably excluded are acrylate rubber and epichlorohydrin rubber.

Other non-limiting examples of rubber components are halobutyl rubbers and halogenated (e.g., brominated) rubber copolymers of p-alkylstyrene and an isomonoolefin having from 4 to 7 carbon atoms (e.g. isobutylene). Still other examples are rubber homopolymers of conjugated dienes having from 4 to 8 carbon atoms and rubber copolymers having at least 50 weight percent repeat units from at least one conjugated diene having from 4 to 8 carbon atoms.

Rubber components can also be natural rubbers or synthetic homo or copolymers of at least one conjugated diene. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Comonomers that may be used include vinyl aromatic monomer(s) having from 8 to 12 carbon atoms and acrylonitrile or alkyl-substituted acrylonitrile monomer(s) having from 3 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

Rubber components can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

A list of preferred rubber components are any rubber selected from the group of ethylene-propylene-diene rubber, natural rubber, butyl rubber, halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereof.

Thermoplastic Component. The term "thermoplastic component" broadly means any material that is not a "rubber" (as defined herein) and that is a polymer or polymer blend considered by persons skilled in the art as being thermoplastic in nature, e.g., a polymer that softens when exposed to heat and returns to its original condition when cooled to room temperature. All the random propylene copolymers (RPCs) and polypropylenes mentioned herein are considered all or part of the thermoplastic component referenced in the claims. The RPCs are discussed below in greater detail.

In one or more embodiments, in addition to including a polypropylene with a melting point greater than about 110° C., or 120° C., or 130° C., or 140° C., or 150° C. (prefer isotactic polypropylene), the TPV also includes a different polypropylene, having a melting point less than about 105° C., which preferably also has a heat of fusion of from 2 to 90 Joules per gram, and a crystallinity of from 2% to 65% of the crystallinity of isotactic polypropylene homopolymer. That different polypropylene is preferably crystallizable, more preferably a "semicrystalline polypropylene" and is most preferably the RPC described below.

In one or more embodiments, the polypropylene that is preferably the random propylene copolymer can occupy more than 90 wt % of the thermoplastic component; or that polypropylene can occupy more than 95 wt % of the thermoplastic component; or that semicrystalline polypropylene can occupy essentially 100 wt % of the thermoplastic component. In one or more embodiments, neither of the thermoplastic components is crosslinked, even when subjected to the vulcanization that results in crosslinking of the rubber component.

In one or more embodiments, the thermoplastic component can additionally include polypropylene (preferably isotactic) having a melting point greater than 110° C. In certain embodiments, the thermoplastic component may include a polypropylene polymer having a melt flow index of 10 to 30 g/10 min. Alternatively, the thermoplastic component may include a "fractional" polypropylene having a melt flow index less than 1.0 g/10 min. In yet another embodiment, the thermoplastic component further includes a first polypropylene having a melting point greater than 110° C. and a melt flow ranging from 10 to 30 g/10 min and a second polypropylene having a melting point greater than 110° C. and a melt flow of less than 1.0 g/10 min. In each of the compositions described herein, the RPC preferably constitutes the major thermoplastic phase component.

Polypropylene. The term "polypropylene" as used herein broadly means any polymer that is considered a "polypropylene" by persons skilled in the art (as reflected in at least one patent or publication). Preferably, the polypropylene used in the compositions described herein that has a melting point above 110° C. includes at least 90 wt % propylene units and is isotactic. Alternatively, instead of isotactic polypropylene, a composition may include a syndiotactic polypropylene, which in certain cases can have a melting point above 110° C. Yet another alternative composition can include an atactic polypropylene. The polypropylene can either be derived exclusively from propylene monomers (i.e., having only propylene units) or be derived from mainly propylene (more than 80% propylene). As noted elsewhere herein, certain polypropylenes have a high MFI (e.g., from a low of 10, or 15, or 20 g/10 min. to a high of 25 to 30 g/10 min. Others have a lower MFI, e.g., "fractional" polypropylenes which have an MFI less than 1.0.

Additives. The term "additive" is defined herein to include any material that may be included as a part of the TPV but that is neither a rubber component nor a thermoplastic component. For example, any process oil, curing agent, or filler is regarded as an "additive" for purposes of this patent disclosure. Curative and process oils are discussed below. A nonexlusive list of additives broadly includes carbon black and other particulate fillers, silica, titanium dioxide, colored pigments, clay, zinc oxide, stearic acid, stabilizers, anti-degradants, flame retardants, processing aids, adhesives, tackifiers, plasticizers, wax, discontinuous fibers (such as cellulose fibers). Particularly when non-black fillers are used, it is desirable to include a coupling agent to compatibilize the interface between the non-black fillers and the polymers. Desirable amounts of carbon black, when present, are from about 5 to about 250 parts by weight per 100 parts by weight of rubber component.

Curative. Another additive is a curative, which crosslinks (vulcanizes) the crosslinkable rubber phase. The type of curative used in this disclosure depends on the type of rubber to be crosslinked. The curatives for each type of rubber are generally conventional for those rubbers in thermoplastic vulcanizates and also generally useful in conventional amounts. The curatives include, but are not limited to, phenolic resin curatives and sulfur curatives (with or without accelerators), accelerators alone, peroxide curatives, hydrosilation curatives using silicon hydride and platinum or peroxide catalyst, etc. Preferably, when the rubber component is an EPM, a peroxide curative is used.

Additive Oil. The term "additive oil" is defined herein to include both "process oils" and "extender oils," and each of those terms is defined herein in accordance with the broadest definition or usage of that term in any issued patent or publication. For example, extender oils include a variety of hydrocarbon oils and also include certain plasticizers (e.g., ester plasticizers). In an illustrative TPV, an additive oil can be present in amounts from about 5 to about 300 parts by weight per 100 parts by weight of the blend of rubber and thermoplastic components. The amount of additive oil may also be expressed as from about 30 to 250 parts, and more desirably from about 70 to 200 parts by weight per 100 parts by weight of the rubber component. Many additive oils are derived from petroleum fractions, and have particular ASTM designations depending on whether they fall into the class of paraffinic, naphthenic, or aromatic oils. Other types of additive oils, which can be used in the TPVs herein, are alpha olefinic synthetic oils, such as liquid polybutylene, e.g., products sold under the trademark Parapol®. The type of additive oil utilized will be that customarily used in conjunction with a particular rubber component. The ordinarily skilled chemist will recognize which type of oil should be used with a particular rubber, and also be able to determine the amount (quantity) of oil. The quantity of additive oil can be based on the total rubber content, and defined as the ratio, by weight, of additive oil to total rubber in the TPV, and that amount may in certain cases be the combined amount of process oil (typically added during processing) and extender oil (typically added after processing). The ratio may range, for example, from about 0 to about 4.0/1. Other ranges, having any of the following lower and upper limits, may also be utilized in a TPV: A lower limit of 0.4/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both. Additive oils other than petroleum based oils can be used also, such as oils derived from coal tar and pine tar, as well as synthetic oils, e.g., polyolefin materials (e.g., Nexbase™, supplied by Fortum Oil and Gas Oy). Examples of plasticizers that are often used as additive oils are organic esters and synthetic plasticizers. Certain rubber components (e.g., EPDMs, such as Vistalon 3666) include additive oil that is preblended before the rubber component is combined with the thermoplastic.

Shore A Hardness and Rebound. One of the surprising features of the invention is that the full range of properties considered to be desirable to a TPV are embodied in the TPV compositions described herein, as reflected in the Examples below. For example, lower Shore-A Hardness and higher Rebound values are achieved without sacrificing other important properties, and also without the need to add amounts of oil that may increase the danger of oil weeping. Also, low Shore-A Hardness and higher Rebound is achieved without sacrificing ease of processability.

One of the properties that may be recited in certain claims is Shore A Hardness. The test procedure used to calculate or measure Shore A Hardness is described below, in the Examples. In each of the TPV compositions described herein, the composition preferably has a Shore A Hardness of 45 or less. Alternatively, the composition can have a Shore A Hardness of 40 or less. Alternatively, the composition can have a Shore A Hardness of 35 or less.

Another property that may be recited in certain claims is Rebound, a property that can be measured in accordance with the test method described in ISO 4662. Certain TPV compositions described herein that include RPC advantageously have high Rebound values, particularly in context of their tensile strengths (e.g., UTS). In at least one specific embodiment, a TPV composition that includes RPC has a Rebound greater than 55%. In addition, TPV compositions that include RPC can have, in certain embodiments, any one of the following Rebound values, ranging from a low value of 60% or more, or 65% or more, or 70% or more, or 80% or more, or 85% of more, to a high value of 100% or less, or 95% or less, or 90% less, or 85% or less.

As mentioned above, TPV compositions that include RPC can be prepared having any one of the Shore-A hardness values (or ranges) identified above, in combination with any one of the Rebound values (or ranges) identified above. Furthermore, those TPV compositions can also have a Tensile Strength (UTS) ranging from 0.5 to 15 MPa, or more narrowly from 1 to 10 MPa, or more narrowly still from 2 to 7 MPa. The range of Tensile Strengths can range from a low of 0.5, or 1, or 2, or 3, or 4, or 5, to a high of 6, or 7, or 8, or 9, or 10, or 12, or 15 MPa. In at least certain embodiments, a TPV composition having a Shore-A Hardness ranging from 25 to 50 has a Tensile Strength ranging from 2 to 7 MPa.

Random Propylene Copolymer (RPC)

The term "random propylene copolymer" (RPC) in its broadest sense herein means a polymer that is not a "block copolymer" and that includes at least two different types of monomer units, one of which is propylene. Preferably, the other monomer unit (e.g., the monomer from which the monomer unit of the polymer is derived) is ethylene, although other monomer units are also contemplated.

In one or more specific embodiments, the random propylene copolymer recited in the claims may also have one or more additional features, such as having a heat of fusion of from 2 to 90 joules/gram, a melting point less than about 105° C., and a crystallinity of from 2% to 65% of the crystallinity of isotactic polypropylene. Specific ranges of the aforementioned properties, as well as other properties entirely, are identified below, and may also be recited in certain claims.

Accordingly, the RPC itself may include one, some, or all of the following properties or characteristics, where ranges from any recited upper limit to any recited lower limit are contemplated.

The RPC should have any one of the following melting points, ranging from a low value of 25° C., or 30° C., or 35° C., or 40° C., or 45° C., or 50° C., to a high value of 105° C., or 100° C., or 95° C., or 90° C., or 85° C., or 80° C., or 85° C., or 80° C., or 75° C., or 70° C. In other specific embodiments, the melting point of the RPC can be expressed as any one of a selection of ranges, e.g., ranging from 30° C. to 70° C. or from 40° C. to 50° C.

The RPC may have a heat of fusion ranging broadly from 1.0 joule per gram (J/g) to 90 J/g; or more narrowly from 2 J/g to 40 J/g; or from 5 J/g to 35 J/g; or from 7 J/g to 25 J/g. In one or more specific embodiments, the random propylene copolymer has a heat of fusion of 75 J/g or less, or 50 J/g or less, or 35 J/g or less.

The RPC may have a molecular weight distribution (MWD) $M_w/M_n$ ranging from 1.5 to 40; or from 2 to 20; or from 2 to 10; or from 2 to 5. In one or more specific embodiments, the polydispersity (Mw/Mn) of the first polymer ranges from a low of 1.8, or 1.9, or 2.0 to a high of 2.3, or 2.2, or 2.1.

The RPC may have a number average molecular weight (Mn), as determined by gel permeation chromatography (GPC), that can preferably range (for example) from a low of 10,000, or 20,000, or 30,000, or 40,000, or 50,000, or 60,000, to a high of 300,000, or 250,000, or 200,000, or 150,000, or 100,000, or 80,000.

The RPC may have a Mooney viscosity (ML (1+4)@125° C.) that can preferably range (for example) from a low of 4, or 5, or 6, or 7, to a high of 45, or 35, or 30.

Other properties disclosed herein, including ranges within or overlapping the aforementioned properties, are discussed below and also in the patents that are incorporated by reference herein.

Crystallinity. In at least certain specific embodiments, an important feature of the RPC is crystallinity, which in at least certain embodiments reflects the relative crystallinities derived from different monomer units. Preferably, the RPC is a propylene α-olefin copolymer, having a propylene-derived crystallinity that is isotactic, syndiotactic, or a combination thereof. In one or more embodiments, ethylene is copolymerized with the propylene, so that the RPC includes propylene units (units on the polymer chain derived from propylene monomers) and ethylene units (units on the polymer chain derived from ethylene monomers). In other embodiments, ethylene is replaced, in part or wholly, with higher α-olefins ranging from $C_4$ to $C_{20}$, such as, for example, 1-butene, 4-methyl-1-pentene, 1-hexene or 1-octene and 1-decene, or mixtures thereof. The propylene content of the RPC may range from about 50 wt. % to about 92 wt. % in one embodiment and from about 70 wt. % to about 90 wt. % in another embodiment and from about 75 wt. % to about 90 wt. % in another embodiment. Alternatively, in one or more of the compositions described herein, the random propylene copolymer (RPC) can consist essentially of from 80 to 95 weight percent repeat units from propylene and from 5 to 20 weight percent of repeat units from one or more unsaturated olefin monomers having 2 or 4 to 12 carbon atoms. Other propylene content ranges are also contemplated, as discussed below.

The crystallinity interruption in certain RPCs may be predominantly controlled by the incorporation of the non propylene monomer units, such as ethylene. Accordingly, the comonomer content of the RPC (preferably ethylene units) may range from about 5 wt. % to about 25 wt. % in one embodiment and from about 10 wt. % to about 25 wt. % in another embodiment and from about 15 wt. % to about 25 wt. % in still another embodiment. In one or more of the compositions described herein, the random propylene copolymer can have a comonomer content from 10 wt % to 25 wt %; or greater than 10 wt %; or greater than 12 wt %; or greater than 15 wt %.

The propylene-derived crystallinity of the RPC in certain TPVs may be selected to ensure the desired compatibility with the other ingredients of the TPV, e.g., with the other polymers in the thermoplastic component, as well as with the rubber component and additives. In a preferred aspect, the propylene-derived crystallinity is selected relative to any polypropylene resin present in the thermoplastic component. In some embodiments, the tacticity of the RPC and the tacticity of the polypropylene component (which may include two or more different polypropylene polymers) may be the same or substantially the same; by substantially it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In a preferred embodiment, both the polypropylene and the RPC in the thermoplastic component have isotactic sequences. The type and level of crystallinity may be determined by NMR. For the RPC the presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences. In certain embodiments, the crystallinity of the RPC may vary widely, and may range, for example, from about 2% to about 65% as measured by differential scanning calorimetry in one embodiment and from about 5% to about 40% in another embodiment, where the crystallinity is expressed as a percentage of the measured crystallinity of isotactic polypropylene homopolymer.

The crystallinity of an RPC, particularly, isotactic propylene-derived crystallinity, can be expressed in terms of a quantifiable property that is based on any standard ASTM test. One crystalline property is "heat of fusion," measured using a Differential Scanning Calorimetry (DSC) test, most preferably in accordance with ASTM E-794-95. Preferably, about 6 mg to about 10 mg of a sheet of the polymer to be tested is pressed at approximately 200° C. to 230° C., then removed with a punch die and annealed at room temperature for 48 hours. At the end of that period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak(s) of the sample, which is typically at a maximum peak at about 30° C. to about 175° C. and occurs between the temperatures of about 0° C. and about 200° C. The thermal output is measured in Joules as a measure of the heat of fusion.

Melting Point. Yet another crystallinity parameter that can be used to characterize the RPC is the "melting point," which is arrived at using the DSC test described above. With that DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. Furthermore as with the DSC method the peak location may be influenced (but probably to a greater degree) by annealing and relaxation treatments. Therefore, it is recommended that the sample pretreatment procedure stated above for the DSC be followed.

The polymers referred to as "random propylene copolymers" in U.S. Pat. No. 6,288,171, are considered to be "random propylene copolymers" herein, and the portions of that patent referring to random propylene copolymers are hereby incorporated by reference, including their chemical structures, properties and the various methods of making them, including the catalyst systems and process conditions used to make them. Other examples of polymers that qualify as RPCs herein are the "propylene ethylene polymers" in WO 02/083753 A1 and in U.S. Pat. No. 6,525,157. The text of U.S. Pat. No. 6,525,157 that refers to propylene ethylene polymers is hereby incorporated by reference for purposes of U.S. patent practices, including the polymers, their properties and the methods for making them, including the reaction conditions, equipment and catalyst systems. Accordingly, a useful RPC herein is a propylene ethylene polymer comprising 5 to 25% by weight of ethylene-derived units and 95 to 75% by weight of propylene-derived units, the copolymer having: a) a melting point less than 90° C.; a relationship of elasticity to 500% tensile modulus such that Elasticity$\leq 0.935M+12$ where elasticity is in percent and M is the 500% tensile modulus in MPa; and c) a relationship of flexural modulus to 500% tensile modulus such that Flexural Modulus$\leq 42\ e+^{0.27M}+50$, where flexural modulus is in MPa and M is the 500% tensile modulus in MPa. In one or more embodiments, the RPCs are substantially devoid of any substantial intermolecular heterogeneity in tacticity and comonomer composition and/or are substantially devoid of any substantial heterogeneity in intramolecular composition distribution.

In certain embodiments, a particular percentage of the RPC, e.g., at least about 75 wt. %, or at least about 80 wt. %, or at least about 85 wt. %, or at least about 90 wt. %, or at least about 95 wt. %, or at least about 97 wt. %, or at least about 99 wt. % of the RPC is soluble in a single temperature fraction, or in two adjacent temperature fractions, with the balance of the copolymer, being found in immediately preceding or succeeding temperature fractions. A variety of solvents may be used for those fractionations, including boiling pentane, hexane, heptane or di-ethyl ether. Each of the aforementioned percentages refer to fractions obtained using any of the listed solvents. Preferably, the listed percentages are obtained using hexane, beginning at 23° C., and then subsequent fractions are in approximately 8° C. increments above 23° C.

Any number of processes may be used to form the RPCs. In one or more specific embodiments, the random propylene copolymers are made using random polymerization methods, including those described in U.S. Pat. No. 6,288,171, the pertinent text of which is incorporated by reference for purposes of U.S. patent practice. The RPC may in certain embodiments be formed in a single reactor, as opposed to one or more series reactors (e.g., two or more reactors arranged in series). Also, those patents note that the RPC is preferably formed in a single continuous reactor, as opposed to a batch reactor; that the continuous polymerization has sufficient back-mixing such that there are no concentration gradients within the reactor; and that the polymerization is preferably solution polymerization (as opposed to slurry or gas-phase polymerization) such that the catalyst system exists in a single-phase environment.

Preferably, the random propylene copolymers are made in the presence of a metallocene catalyst system. As a nonlimiting example, metallocene catalyst systems that may be used for making the random propylene copolymers include a bis-indenyl compound, particularly a bridged bis-indenyl compound, and even more particularly a bridged bis-indenyl compound without any 2-substitutions. Alternatively, however, in one or more specific embodiments, any RPC used in a TPV may be prepared using a single site catalyst capable of permitting tactic insertion. For example, in at least certain embodiments, a polymer made in accordance with the disclosure of WO 03/04201 may qualify as an RPC.

EXAMPLES

The following examples discuss various random propylene copolymer (RPCs) and various thermoplastic vulcanizate compositions (TPVs), for purposes of illustrating aspects of the claims.

For purposes of convenience, various specific test procedures are identified for determining properties recited in the claims, such as melting point, monomer composition, Shore A Hardness and tensile strength. However, when a person of ordinary skill reads this patent and wishes to determine whether a composition or polymer has a particular property identified in a claim, then any published or well-recognized method or test is deemed to be acceptable to determine that property, although the specifically identified procedure is preferred. Each claim should be construed to cover the results of any of such procedures, even to the extent different procedures may yield somewhat different results or measurements. Thus, a person of ordinary skill in the art is to expect experimental variations in measured properties that are reflected in the claims. All numerical values can be considered to be "about" or "approximately" the stated value, in view of the nature of testing in general.

Example 1

Some of the TPVs in the examples below are formed using RPCs, each of which is different, having different Mooney Viscosities and/or ethylene contents. Those RPCs are summarized in Table 1 below.

TABLE 1

| No. | Mooney Viscosity | Comonomer | Comonomer content (wt %) |
|---|---|---|---|
| RPC-1 | 12 | Ethylene | 16 |
| RPC-2 | 29 | Ethylene | 12 |
| RPC-3 | 12 | Ethylene | 12 |
| RPC-4 | 10 | Ethylene | 13 |
| RPC-5 | 21 | Ethylene | 16 |
| RPC-6 | 11 | Ethylene | 11 |

Example 2

This example discusses the ingredients and various physical properties of four different TPV formulations summarized in Table 2. The first formulation (TPV-1) is a comparative TPV that includes rubber and two different polypropylenes but no random propylene copolymer. The other TPV formulations in Table 2 have the indicated amounts of random propylene copolymer (weight percentages of the TPV), with reduced amounts of crystalline polypropylene, specifically with less than 2 wt % of the high flow rate polypropylene. All those TPV formulations that included random propylene copolymer (RPC) experienced a lower Shore-A Hardness and a higher Rebound than the TPV without the RPC. Surprisingly, the Shore-A Hardness for the TPV-2 sample was 37, which was substantially lower than that of other samples, even though the other samples contained precisely the same amount of RPC (17.7 wt %). Further, even though it was "softer" than those other samples, the TPV-2 sample still retained acceptable tensile and elongation properties. Additionally, the Rebound for the TPV-2 sample was 65%, which was substantially higher than the Rebound for the TPV-1 sample (39%). The softness of each TPV composition increased due to the presence of the RPC, even though the amount of added process oil remained constant in each case, being at a level below 18 wt % (specifically 16.2 wt %). Also, it was observed that the TPV containing an RPC with a comonomer (C2) content that was at a level of 15 wt % or more (specifically 16 wt %) experienced an extremely low Shore-A hardness that was below 40 (specifically 37), and achieved other desirable properties, particularly a Rebound of 65% (i.e., above 55%). Also, the TPV compositions containing an RPC with a comonomer (C2) content of 10 wt % or above (specifically 11 wt %) had a Shore-A hardness of less than 55. Also, it was observed that whereas the Shore-A Hardness level varied dramatically based on the particular comonomer in the RPC (compare TPV-2 with TPV-3 and TPV-4), the Rebound level was less variable, with the Rebound of TPV-2 being only slightly higher than the Rebound of TPV-3 or TPV-4.

TABLE 2

| Composition | TPV-1 | TPV-2 | TPV-3 | TPV-4 |
|---|---|---|---|---|
| Fractional PP D008M - Aristech | 17.7 | 0.0 | 0.0 | 0.0 |
| High Flow PP HF135MO-Borealis | 1.2 | 1.2 | 1.2 | 1.2 |
| Vistalon 3666 | 50.0 | 50.0 | 50.0 | 50.0 |
| Clay polestar 200P | 12.3 | 12.3 | 12.3 | 12.3 |
| ZnO | 0.6 | 0.6 | 0.6 | 0.6 |
| SnCl2 | 0.4 | 0.4 | 0.4 | 0.4 |
| Oil sunpar 150 | 16.2 | 16.2 | 16.2 | 16.2 |
| Resin SP 1045 | 1.6 | 1.6 | 1.6 | 1.6 |

TABLE 2-continued

| Composition | TPV-1 | TPV-2 | TPV-3 | TPV-4 |
|---|---|---|---|---|
| RPC-1 | 0.0 | 17.7 | 0.0 | 0.0 |
| RPC-2 | 0.0 | 0.0 | 17.7 | 0.0 |
| RPC-3 | 0.0 | 0.0 | 0.0 | 17.7 |
| Total | 100 | 100 | 100 | 100 |
| Properties: | | | | |
| Mod 20 (MPa) | 2.5 | 0.3 | 0.7 | 0.7 |
| Mod 50 (MPa) | 3.5 | 0.6 | 1.2 | 1.1 |
| Mod 100 (MPa) | 4.4 | 0.8 | 1.8 | 1.6 |
| Mod 200 (MPa) | 5.7 | 1.6 | 3.0 | 2.5 |
| Mod 300 (MPa) | — | 2.5 | 4.5 | 3.4 |
| Elongation (%) | 222 | 326 | 370 | 444 |
| UTS (MPa) | 5.8 | 2.6 | 5.8 | 5.6 |
| Hardness (ShA) after 15" | 79 | 37 | 53 | 53 |
| Rebound (%) | 39 | 65 | 61 | 57 |
| Tension set (%) | | | | |
| ISO 412 (10 min @ RT) | 15.2 | 7.4 | 7.3 | 9.8 |
| ISO 2285 (25%) | 5.3 | 5.9 | 4.1 | 4.6 |
| Compression Set (%) | | | | |
| 22 hrs @ RT | 19 | 12 | 9 | 11 |
| 22 hrs @ 100° C. | 48 | 80 | 64 | 83 |
| 22 hrs @ 100° C. cool with load | 71 | 95 | 96 | 97 |

Referring to Table 2, the Fractional PP D008M is a polypropylene supplied by Aristech, having a MFI of less than 1.0. The HF 135MO polymer is a commercial polypropylene homopolymer supplied by Borealis Technology having a MFI of 20 (ASTM 1238-98; 230° C./2.16 kg), and in the experiments demonstrated herein the amount of the high MFI polypropylene was maintained at 1.2 wt %. In other embodiments, a TPV composition containing an effective amount of an RPC as defined herein can have a polypropylene (preferably, but not necessarily a homopolymer) with an MFI of 10 or more, or 15 or more, or 20 or more, in the amount of 5 wt % or less, or 4 wt % or less, or 3 wt % or less, or 2 wt % or less. Other polypropylenes, having different MFI levels, are also useful. Vistalon 3666 is an EPDM rubber product that was supplied commercially by ExxonMobil, in which EPDM terpolymer had a Mooney Viscosity of 5; an ethylene content of 64 wt % and 3.9 wt % ethylidenenorbornene, the balance being propylene; and was blended with 43 wt % paraffinic process oil based on the total amount of EPDM rubber and oil. The Sunpar® 150 paraffinic process oil was supplied by Sunoco. Polestar® 200P is CaCO3 (calcium carbonate), a calcinated clay, supplied by ECCI (English China Clay International). ZnO (zinc oxide) is a curing additive. SnCl2 is stannous chloride, which functions as a retarding agent, also considered a curing decelerator. Resin SP 1045 is a phenolic resin curing agent supplied by Schenectady.

The stress-strain properties for each TPV sample reported in Table 2 were measured in accordance with ISO 37, in which Mod 20 (MPa) refers to 20 percent modulus; Mod 50 (MPa) to 50 percent modulus; Mod 100 (MPa) to 100 percent modulus; Mod 200 (MPa) to 200 percent modulus; and Mod 300 (MPa) to 300 percent modulus. Elongation (%) refers to elongation at break, and was also measured in accordance with ISO 37. UTS (MPa) refers to ultimate tensile strength, measured in accordance with ISO 37. Hardness (ShA) refers to Shore A Hardness, measured in accordance with ISO 868-85 (after 15 seconds). Rebound values were measured in accordance with ISO 4662. Tension Set values (%) were measured in accordance with ISO 412 (10 min @ room temperature) and also in accordance with ISO 2285 (25%). Compression Set (%) values were measured in accordance with ISO 815B, method B by compressing samples for 22 hours at the indicated temperature.

Example 3

This example discusses the ingredients and physical properties of four different formulations (TPV-5, TPV-6., TPV-7 and TPV-8), summarized in Table 3.

The first formulation in Table 3 (TPV-5) is a comparative TPV that included rubber (Vistalon 3666) and two different polypropylenes, but no random propylene copolymer. The other TPV formulations have the indicated amounts of a random propylene copolymer (weight percentages of the TPV) with no polypropylene present (in contrast with the formulations shown in Table 2). All those TPV formulations that included random propylene copolymer experienced a lower Shore-A Hardness that was substantially lower than that of the TPV formulation that lacked the random propylene copolymer (TPV-5). That is, the Shore-A Hardness ranged from 18 to 26, but still retained other desirable TPV properties. The Shore-A Hardness for the TPV-7 sample was remarkably low (18), and was substantially lower than the Shore-A Hardness of the other TPV samples, even those others (TPV-6 and TPV-8) that contained the same amount of random propylene copolymer. As with the softest TPV product in Table 1, the softest TPV product in Table 2 included the random propylene copolymer with the highest comonomer content (16%). Even though it was "softer" than those products, the TPV-2 sample still retained acceptable properties, e.g., rebound, tensile and elongation properties.

TABLE 3

| Composition | TPV-5 | TPV-6 | TPV-7 | TPV-8 |
|---|---|---|---|---|
| Vistalon 3666 | 51.84 | 51.84 | 51.84 | 51.84 |
| PP HF 136 MO | 3.55 | 0 | 0 | 0 |
| PP HA 507 MO | 4.44 | 0 | 0 | 0 |
| Kraton G 1651 | 0 | 0 | 0 | 7.99 |
| RPC-4 | 0 | 7.99 | 0 | 0 |
| RPC-5 | 0 | 0 | 7.99 | 0 |
| CaCO3 Polestar 200P | 12.44 | 12.44 | 12.44 | 12.44 |
| Sunpar 150 | 23.87 | 23.87 | 23.87 | 23.87 |
| ZnO | 0.59 | 0.59 | 0.59 | 0.59 |
| SnCl2 | 0.37 | 0.37 | 0.37 | 0.37 |
| Wax Okerin 2709 H | 1.03 | 1.03 | 1.03 | 1.03 |
| SMD 31214 (RIO) | 1.87 | 1.87 | 1.87 | 1.87 |
| Total | 100 | 100 | 100 | 100 |
| Properties | | | | |
| Hardness (ShA) | 47 | 26 | 18 | 24 |
| Tensile (MPa) | 3.0 | 2.4 | 0.9 | 1.5 |
| Elongation (%) | 320 | 428 | 375 | 333 |
| Modulus at 100% (MPa) | 1.25 | 0.51 | 0.36 | 0.55 |
| Modulus at 300% (MPa) | 2.90 | 1.49 | 0.87 | 1.41 |
| Tear Strength (kN/m) | 14 | 7 | 5 | 8 |
| CS at RT (%) | 16 | 13 | 19 | 16 |
| CS at 70° C. (%) | 33 | 68 | 60 | 49 |
| Oil Weeping | No | No | No | No |
| Rebound (%) | 55 | 68 | 69 | 71 |

The TPV-5 sample in Table 3 included two different polypropylenes. The first polypropylene was HF 136 MO, described above for Table 1. The second was HA 507 MO, a polypropylene homopolymer, having an MFI of 0.7 (ASTM 1238-98; 230° C./2.16 kg) supplied by Borealis. The Kraton G 1651 product was supplied by Kraton Polymers. All the samples in Table 2 include Vistalon 3666, a rubber product described above for Table 2, and Sunpar 150, a process oil also described above. For clarification, it is noted that the amount of Sunpar 150 in Table 3 represented only the added process oil, and did not include the process oil that was already preblended with the Vistalon 3666. Other ingredients include Polestar 150, zinc oxide and stannous chloride, also described above for Table 2. Yet other ingredients include Okerin 2709 H, a wax supplied by Sovereign Chemical Company which functions as a processing aid. SMD 31214 (resin in oil) is SP-1045 resin (described above) diluted with 70 wt % paraffinic oil.

Hardness (ShA) is a physical property of the TPV described above for Table 2. Tensile (MPa) is ultimate tensile strength, described above. Elongation (%) is elongation of break, also described above. Modulus at 100% (MPa) and the Modulus at 300% (MPa) are described above for Table 2 as Mod 100 and Mod 300. Tear Strength (kN/m) was measured in accordance with ISO 34. The term CS at RT (%) refers to compression set, for 22 hours at room temperature. The term Oil Weeping refers to a visual test, noting whether any process oil was observed to exude from the TPV. Rebound (%) is described above.

Example 4

This example discusses the ingredients and physical properties of a single formulation, summarized in Table 4.

TABLE 4

| Composition | TPV-9 (PHR) |
|---|---|
| VX 1696 | 200 |
| AES 150 PR oil | 128.1 |
| DC2-5084 | 2 |
| PC 085 | 1.9 |
| RPC-6 | 25 |
| Properties | |
| Hardness (ShA) | 18 |
| Tensile (MPa) | 2.6 |
| Elongation (%) | 364 |
| Modulus at 100% (MPa) | 0.5 |
| CS (%, 22 hrs, 70° C.) | 53 |
| TS (%) | 2 |
| Tear C (pli) | 32 |

VX 1696 is an EPDM rubber product, supplied by ExxonMobil, in which the EPDM terpolymer had a Mooney Viscosity of 52; an ethylene content of 62 wt % and 0.7 wt % vinyl norbornene, the balance being propylene; and was blended with 50 wt % paraffinic process oil based on the total amount of EPDM rubber and oil. AES 150 is a process oil supplied by Sunoco. DC2-5084 is a silane-based curing agent supplied by Dow Corning. PC 085 is a platinum catalyst product supplied by United Chemical. The definitions and test procedures for Hardness (ShA), Tensile (MPa), Elongation (%) and Modulus (MPa) described above. CS (%, 22 hrs, 70° C.) refers to Compression Set at 70° C. for 22 hours, and the test procedure used to measure that property was ASTM D-395. TS (%) means Tension Set, measured by taking a 2-inch long specimen with 0.08 inch thickness and width at room temperature, elongating it 100% for ten minutes, then allowing it to relax for ten minutes. The percentage change in length is the Tension Set. The test procedure or method used to measure Tear C (pli) was ASTM D 1004-90.

What is claimed is:

1. A thermoplastic vulcanizate composition, comprising:
   a) a dispersed at least partially vulcanized rubber component;

b) a thermoplastic component that includes polypropylene having a melting point greater than 110° C. and a random propylene copolymer having a melting point ranging from 25° C. to 105° C.; and c) additive oil; wherein:
(i) the weight ratio of the thermoplastic component to the rubber component ranges from 80:20 to 15:85;
(ii) the weight ratio of the random propylene copolymer to the polypropylene is greater than 100:100; and
(iii) the Rebound of the composition is greater than 55%.

2. A thermoplastic vulcanizate composition, comprising:
a) a dispersed at least partially vulcanized rubber component;
b) a thermoplastic component that includes polypropylene having a melting point greater than 110° C. and a polypropylene having a melting point ranging from 25° C. to 105° C.; and
c) additive oil; wherein:
(i) the weight ratio of the thermoplastic component to the rubber component ranges from 80:20 to 15:85;
(ii) the weight ratio of the polypropylene having a melting point ranging from 25° C. to 105° C. to the polypropylene having a melting point greater than 110° C. is greater than 100:100; and
the Rebound of the composition is greater than 55%.

3. The thermoplastic vulcanizate composition of claims 1 or 2, wherein the thermoplastic component comprises more than 80 wt % of a random propylene copolymer having a melting point of from 25° C. to 105° C.

4. The thermoplastic vulcanizate composition of claims 1 or 2, wherein the Shore A Hardness of the composition is 45 or less.

5. The composition of claim 1 in which the polypropylene is isotactic polypropylene.

6. The composition of claim 1 in which the polypropylene is syndiotactic polypropylene.

7. The composition of claim 1 in which the polypropylene is atactic polypropylene.

8. The composition of claim 1 in which the random propylene copolymer has a comonomer content of from 10 wt % to 25 wt %.

9. The composition of claim 1 in which the random propylene copolymer has a comonomer content greater than 10 wt %.

10. The composition of claim 1 in which the random propylene copolymer has a comonomer content greater than 12 wt %.

11. The composition of claim 1 in which the random propylene copolymer has a comonomer content greater than 15 wt %.

12. The composition of claims 1 or 2 in which the composition has a tensile strength of from 0.5 to 15 MPa.

13. The composition of claims 1 or 2 in which the composition has a tensile strength of from 2 to 7 MPa.

14. The composition of claims 1 or 2 in which the composition has a Shore A Hardness of 40 or less.

15. The composition of claims 1 or 2 in which the composition has a Shore A Hardness of 35 or less.

16. The composition of claims 1 or 2 in which the composition has a Rebound of 60% or more.

17. The composition of claims 1 or 2 in which the composition has a Rebound of 65% or more.

18. The composition of claims 1 or 2 in which the composition has a Rebound of 70% or more.

19. The composition of claim 1 in which the random propylene copolymer occupies more than 90 wt % of the thermoplastic component.

20. The composition of claim 1 in which the random propylene copolymer occupies more than 95 wt % of the thermoplastic component.

21. The composition of claim 1 in which the thermoplastic component additionally includes isotactic polypropylene having a melting point greater than 110° C.

22. The composition of claims 1 or 2 in which the thermoplastic component further includes an additional polypropylene polymer.

23. The composition of claims 1 or 2 in which the thermoplastic component further includes a polypropylene having a melt flow rate of from 10 to 30 g/10 min.

24. The composition of claims 1 or 2 in which the thermoplastic component further includes a polypropylene having a melt flow of less than 1.0 g/10 min.

25. The composition of claims 1 or 2 in which the thermoplastic component further includes a first polypropylene having a melt flow ranging from 10 to 30 g/10 min and a second polypropylene having a melt flow of less than 1.0 g/10 min.

26. The composition of claim 1 in which the random propylene copolymer consists essentially of from about 80 to about 95 weight percent repeat units from propylene and from about 5 to about 20 weight percent of repeat units from one or more unsaturated olefin monomers having 2 or 4 to 12 carbon atoms.

27. The composition of claim 1 in which the random propylene copolymer is prepared using a metallocene catalyst system.

28. The composition of claim 1 in which the random propylene copolymer has a heat of fusion of less than 75 joules/gram.

29. The composition of claim 1 in which the rubber component is selected from the group consisting of ethylene-propylene-diene rubber, natural rubber, butyl rubber, halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, and combinations thereon.

30. The composition of claim 1 in which the random propylene copolymer has a melting point ranging from 40° C. to 50° C.

31. The composition of claims 1 or 2 in which the rubber component is ethylene-propylene-diene rubber.

32. The composition of claims 1 or 2 in which the rubber component is butyl rubber, halobutyl rubber, or a halogenated rubber copolymer of p-alkylstyrene and isobutylene or a combination thereof.

33. The composition of claims 1 or 2 in which the rubber component is a rubber homopolymer of a conjugated diene having from 4 to 8 carbon atoms, a rubber copolymer having at least 50 weight percent repeat units from at least one conjugated diene having from 4 to 8 carbon atoms, or combinations thereof.

* * * * *